United States Patent [19]
Shaffer

[11] 4,057,019
[45] Nov. 8, 1977

[54] SELF-CONTAINED STEERING GUIDANCE MEANS

[75] Inventor: Walter M. Shaffer, Peoria, Ill.

[73] Assignee: Caterpillar Tractor Co., Peoria, Ill.

[21] Appl. No.: 650,085

[22] Filed: Jan. 19, 1976

[51] Int. Cl.² .............................................. B61F 9/00
[52] U.S. Cl. ................. 104/247; 104/244.1; 180/131
[58] Field of Search ............... 104/242, 245, 247, 118, 104/119, 244.1; 180/131; 105/141, 144

[56] References Cited

U.S. PATENT DOCUMENTS

| | | | |
|---|---|---|---|
| 927,517 | 7/1909 | Fageol et al. | 104/245 X |
| 1,364,735 | 1/1921 | Dobson | 104/244.1 |
| 2,101,024 | 12/1937 | Heinze | 104/247 |
| 2,925,875 | 2/1960 | Bourdon | 104/245 X |
| 2,972,966 | 2/1961 | Bourdon | 104/247 |
| 3,724,584 | 4/1973 | Varichon | 104/244.1 X |
| 3,796,165 | 3/1974 | Goode | 104/247 |
| 3,850,111 | 11/1974 | Hansen | 104/245 |
| 3,858,523 | 1/1975 | Allsup, Jr. | 104/247 |
| 3,872,794 | 3/1975 | Goode | 104/247 |
| 3,945,455 | 3/1976 | Hamada et al. | 104/247 X |
| 3,977,487 | 8/1976 | Katayose et al. | 104/247 X |
| 3,982,603 | 9/1976 | Michael | 104/244.1 X |

FOREIGN PATENT DOCUMENTS

| | | | |
|---|---|---|---|
| 851,256 | 10/1960 | United Kingdom | 104/244.1 |

*Primary Examiner*—Albert J. Makay
*Assistant Examiner*—Randolph A. Reese
*Attorney, Agent, or Firm*—Phillips, Moore, Weissenberger, Lempio & Majestic

[57] ABSTRACT

A mechanical guidance mechanism is associated with each steerable wheel of a vehicle such as a fork lift truck. The guidance mechanism has a roller guidance member positioned to contact the guide surface laterally adjacent the vehicle. The roller is rotatably mounted on a slidable C-shaped channel member which is slidably disposed over a square bar. The square bar is rigidly, pivotally affixed to the vehicle. The other free end of the bar is pivotally fixed to the first lever at one end, which first lever has a fixed axis about which it pivots substantially midway between one end and an elongated slot on the other end. A second lever having a fixed pivot substantially midway between the ends thereof has a pin rigidly fixed to a first end which traverses the slot in the first lever. The other end of said second lever has a spring rigidly mounted thereon which is mechanically linked to a third lever pivotally fixed to the vehicle intermediate the ends thereof and having a free end thereof fixed to a wheel king pin so as to transmit turning motion to a wheel. A control valve is provided for rendering the hydraulic power system normally controlling the turning motion of the wheel into an inoperative condition whereby the mechanical guidance mechanism fully controls the turning of the wheel. Thus, the mechanical guidance mechanism provides for automatic guided steering of the vehicle in narrow aisle environments which is easily converted to operator control by means of a control valve when the vehicle is taken from a narrow aisle environment.

10 Claims, 3 Drawing Figures

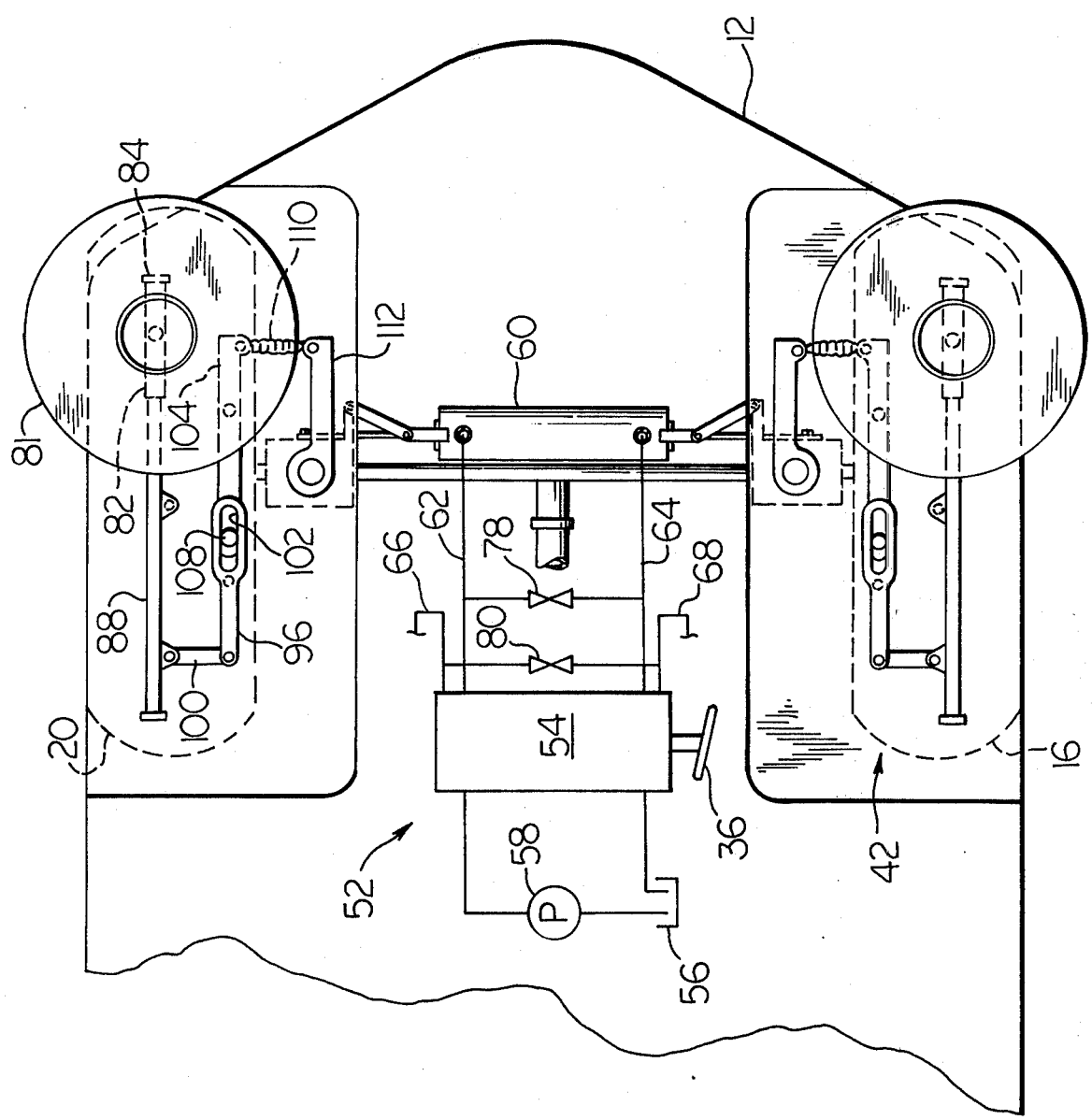

000
SELF-CONTAINED STEERING GUIDANCE MEANS

BACKGROUND OF THE INVENTION

This invention relates to a vehicle steering mechanism particularly applicable to fork lift truck vehicles. More specifically, this invention is directed to a steering guidance means associated with each steerable wheel of the vehicle which senses the vehicle position with respect to a lateral guide surface and mechanically transmits movement to control the turning of the associated wheel. The invention additionally includes a control means for removing the normal hydraulic power steering means from operation whereby the mechanical guidance mechanism is the sole controller of the vehicle steering.

Currently, a real effort is being made to conserve the floor space in storage warehouses by using narrower aisles and accommodating narrow aisle fork lift trucks. Ideally, the width of the narrow aisle should only be slightly greater than the maximum width of the fork lift truck vehicle which travels down the aisles loading and unloading material storage racks arrayed on opposite sides of the aisles. Since it is extremely difficult for an operator to negotiate such narrow aisles without grazing or otherwise hitting the storage racks, guide mechanisms have been developed to guide the vehicle in a precisely determined path within the narrow aisles between rows of storage racks. An additional benefit of these guide means is that they permit the operator to dispense with the function of steering the vehicle and allow him to devote his efforts to other tasks, such as finding the number of the appropriate load space.

Illustrative of one of these prior art guidance means is U.S. Pat. No. 3,850,111 to Hansen. With this patent device, a guide plate assembly mounted under the vehicle, such as a fork lift truck vehicle, has a plurality of rollers laterally extending therefrom on oposite sides of the vehicle. The rollers contact accommodating guide rails and the vehicle is slewed to follow a straight line path between the guide rails. This type of device is not entirely satisfactory, however. The principle reason it is not satisfactory is that there is no positive turning of the vehicle steering wheels. Rather, there is no positive control of the vehicle steering wheels exercised by the guide means. A certain amount of tire wear and vehicle shock is also encountered with this type of system since the unit basically slews or drags the vehicle sideways to maintain the correct aisle position.

However, with the prior art guide means, very strong floor-mounted guide rails are required because this brute force guidance approach results in such great forces that longitudinal members on the racks cannot be used. Such rails on the floor on each side of the aisle are expensive and interfere with the placing of loads directly on the floor so that a bottom shelf is required.

In order to overcome some of these disadvantages a guidance means has been developed to translate the motion of a guidance member contacting the lateral guide surface to the steerable wheels of a vehicle. Examples of this type of device are shown in U.S. Pat. No. 3,858,523 to Allsup, Jr., and U.S. Pat. No. 3,872,794 to Goode. However, while this system which uses the mechanical linkage for translating motion from the guidance member to the wheels of the vehicle is of some improvement, it is nonapplicable to a vehicle wherein the wheels thereof are normally steered by power means such as hydraulic cylinder means.

SUMMARY AND OBJECTS OF THE INVENTION

It is therefore the primary object of this invention to provide a mechanical guidance mechanism for a vehicle having steerable wheels.

It is a further object of this invention to provide such a guidance mechanism having a guidance member positioned to contact a guide surface and direct the vehicle between narrow aisles.

It is a further object of this invention to provide such a guidance mechanism including control means for rendering the hydraulic power system normally controlling steering inoperative whereby operation between narrow aisles is accomplished by a mechanical guidance system positioned to contact a guard surface.

The invention takes the form of a mechanical guidance mechanism associated with each steerable wheel of the vehicle and having a guidance member in the form of a roller for sensing the vehicle position between guide surfaces on opposite sides of a narrow aisle. The roller is rotatably mounted on a C-shaped slide member which is slidably disposed over a square bar. The square bar is pivotally rigidly affixed to the vehicle intermediate the ends thereof. The other end of the bar is rigidly pivotally affixed to a first lever at one end of the lever. The first lever has a fixed axis from which it pivots intermediate its ends. The other end of said first lever includes an elongated slot. The second lever is pivotally affixed to the vehicle intermediate its ends. A pin is rigidly affixed to one end of the second lever and traverses the slot in the first lever. The other end of the second lever has a spring rigidly mounted thereon which is connected to one end of a third lever. The third lever is also pivotally affixed about the free end thereof. The pivot of the third lever is affixed to the vehicle steering knuckle or king pin so as to turn the associated wheel. In addition, a control valve means is provided for rendering inoperative the double acting hydraulic cylinder normally controlling a pair of steerable wheels. In this manner, control of the steering of the vehicle is accomplished by the mechanical means when the vehicle is in the narrow aisle position. After the vehicle has left the narrow aisle position the control valve may be actuated so as to allow the vehicle hydraulic steering system to regain steering control of the vehicle.

Other objects and advantages of the invention will become more apparent from a review of the accompanying drawings and the following description.

BRIEF DESCRIPTION OF THE DRAWINGS

FIG. 2 is a top plan view of the rear portion of the lift truck of FIG. 1, taken along lines II—II in FIG. 1, and also including a schematic drawing of the hydraulic power steering means.

DETAILED DESCRIPTION

Figure 1:
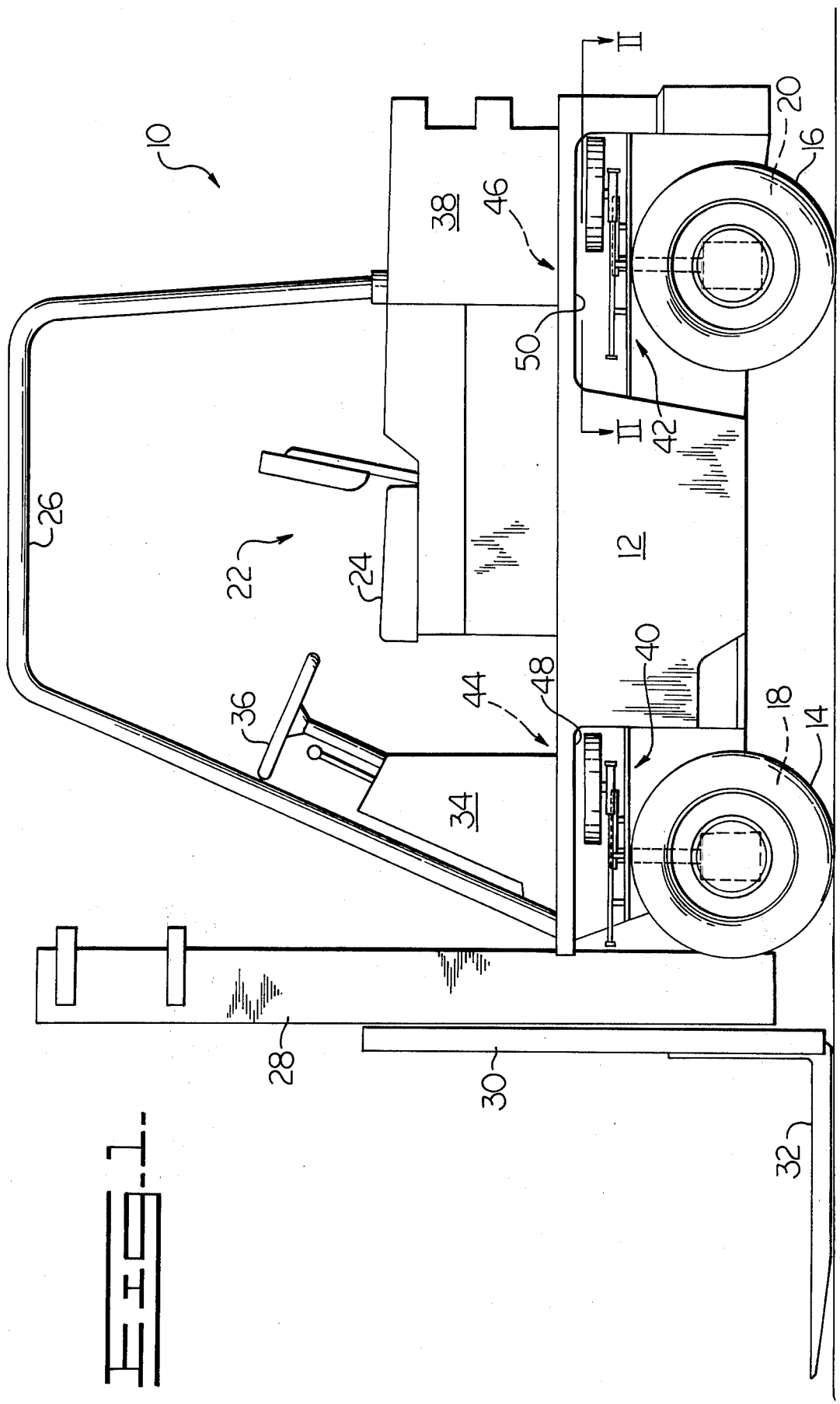
FIG. 1 is a side elevation view of a lift truck embodying the instant invention.

Turning to FIG. 1, there is shown generally at 10 a lift truck vehicle having a body 12 which is supported by a plurality of steerable road wheels 14, 16, 18 and 20.

Body 12 mounts an operator station generally shown at 22 having an operator seat 24 and an overhead guard protection structure 26 thereover. Pivotally mounted on the front of the vehicle is a mast 28 having a vertically movable carriage 30 mounted thereon. Carriage 30 in turn mounts a plurality of forks 32 for engaging a load.

Operator control of the vehicle is accomplished through manual controls mounted on console 34. Steering of the vehicle is accomplished through steering wheel 36 which is connected to a hydraulic power steering means (not shown) within the body of the vehicle. The power for operating this hydraulic power steering means is located within the body of the vehicle at 38.

While this description is directed to a lift truck vehicle, it is to be understood that the invention is not to be limited to this application. Rather, other vehicles which may traverse narrow aisles are also contemplated for use with the instant invention.

Mechanical guidance means 40, 42, 44, 46 are associated with each steerable wheel of the vehicle as will be more fully hereinafter described. As may be discerned from the subject Figure, the mechanical guidance means are positioned within openings, for example openings 48, 50 in the sides of the vehicle body 12.

Figure 3:
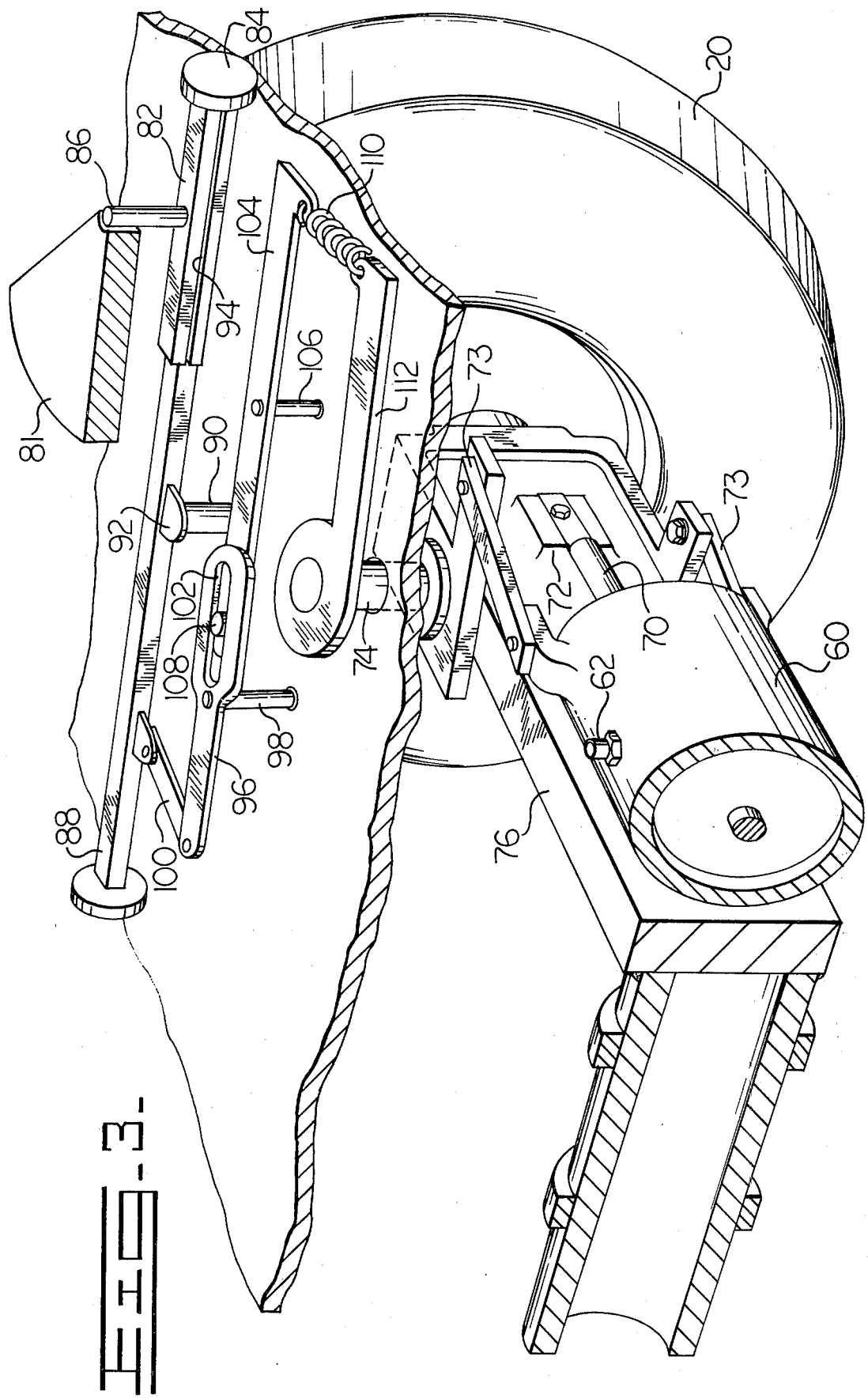
FIG. 3 is a top quarter isometric view partially cut away of the mechanical guidance means of the instant invention associated with a single steerable wheel.

Turning to FIG. 2, an exemplary showing of the rear wheels 16, 20 is shown. A hydraulic power steering system 52 is comprised of a steering control valve 54 which serves to direct hydraulic fluid from a fluid pressure source 56 by means of a pump 58 and thence to the ends of a steering control cylinder 60 through conduits 62, 64. For controlling the steering of the front wheels (not shown), additional conduits 66, 68 are provided. Thus, when normal power steering of the vehicle is desired, rotation of wheel 36 will selectively direct hydraulic fluid to power, for example, steering cylinder 60. As best seen in FIG. 3, rod end 70 of the cylinder 60 is fixed to axle 72 and the steering links 73 are pivotally affixed to the steering knuckle arms for rotating the knuckle on which the wheel axle is mounted. Axle 72 is rotatable by means of king pin 74 which is journalled into the frame member 76.

Turning to FIG. 2, when normal powered steer is desired, valves 78, 80 which intercommunicate the lines leading to opposite sides of the steer cylinders, are, for example, manually closed. In this manner, steer cylinders are effectively in the system and serve to control the steering of the wheels. When it is desired to effectively remove the power steer system from operation, valves 78, 80 are, for example, manually opened and the steer cylinder is effectively bypassed.

Each wheel contains an identical mechanical guidance means. Accordingly, for the sake of convenience, a single guidance means will be discussed hereinafter. As shown in FIGS. 2 and 3, such guidance means comprises a guidance member in the form of a roller 81 which is rotatably mounted on a generally C-shaped bar 82 by means of a vertically oriented pin or pivot 86. C-shaped bar or slide member 82 is telescopically disposed over an elongated square bar 88 having end caps 84 affixed thereto. Square bar 88 is pivotally affixed intermediate its end by means of a vertical pivot 90 which is connected to a tab or bracket 92 extending laterally of the bar. An elongated slot correspondingly located on the side of member 82 allows the member to telescope over bracket 92. A first lever 96 is located substantially parallel to bar 88 and is similarly pivotally supported by a pivot 98 located intermediate the ends of the lever. One end of the lever is pivotally connected by a link 100 to square bar 88. The other end of lever 96 includes an elongated slot 102. The second lever 104 is similarly pivotally affixed to the vehicle intermediate its ends by means of a pivot 106. A vertically oriented pin 108 is rigidly affixed to one end of lever 104 and traverses slot 102 within first lever 96. The other end of second lever 104 is connected by means of a spring 110 to the end of the third lever 112 which has its opposite end connected to king pin 74 for rotation thereof.

In operation, if the vehicle with which the guidance means is associated crowds too close to a rack on the right side of the aisle within which it is traversing, roller 81 through C-shaped slide member 82, square bar 88, linkage 100, first lever 96 and second lever 104 will extend spring 110 which allows, in cooperation with elongated slot 102, a degree of lost motion. Because the mating springs (not shown) on the opposite wheel will not be as highly extended, the unbalance of forces will steer the end of the lift truck away from the rack. The opposite motion will occur for the opposite direction of lift truck travel.

It is to be understood that the foregoing description is merely illustrative of a preferred embodiment of the invention, and that the scope of the invention is not to be limited thereto but is to be determined by the scope of the appended claims.

What is claimed is:

1. In a vehicle defining a longitudinal axis and a lateral direction perpendicular thereto, a steering mechanism for a pair of transversely aligned vehicle-supporting wheels turnable about substantially vertical axes linked together for movement by hydraulic power means, said mechanism including:
   at least one steering guidance member positioned to contact the guide surface laterally adjacent the vehicle, said at least one steering guidance member mounted on said vehicle for movement relative thereto;
   linkage means including lost-motion means, having a resilient member and including an elongated slot connecting said at least one steering guidance member with said wheels to cause said wheels to move about a generally vertical axis upon relative lateral movement between said at least one steering guidance member and said vehicle; and
   means for selectively rendering said hydraulic power means inoperative whereby turning of said wheels is accomplished by at least one steering guidance member through said linkage means.

2. The invention of claim 1 wherein said wheels are turnable on king pins and wherein said linkage includes an arm extending therefrom.

3. The invention of claim 1 wherein said linkage means further includes an input member pivotal about a first axis, and wherein said input member is connected to said guidance member for movement therewith.

4. The invention of claim 3 wherein said linkage means further includes an output member pivotal about a second axis connected to said wheels.

5. The invention of claim 4 wherein said input member is connected to said output member by the lost motion means.

6. The invention of claim 5 wherein the lost-motion means further comprises a first link means pivotally connected to a second link means through said elongated slot.

7. The invention of claim 1 wherein said hydraulic power means is a hydraulic cylinder and wherein said means for rendering said hydraulic power means inoperative comprises control valve means.

8. The invention of claim 7 wherein said control valve means include conduits for selective intercommunication of opposite ends of said hydraulic cylinder.

9. The invention of claim 1 further including a second pair of transversely aligned vehicle-supporting wheels turnable about a generally vertical axis and linked together by second hydraulic power means and including:

a second steering guidance member positioned to contact the guide surface adjacent the vehicle, said second steering guidance member mounted on said vehicle for movement relative thereto;

second linkage means including lost-motion means having a resilient member and including an elongated slot connecting said second steering guidance member with said second pair of wheels to cause said second pair of wheels to move about a vertical axis upon relative movement between said second guidance member and said vehicle; and means for rendering said second hydraulic power means inoperative whereby turning of said second pair of wheels is accomplished by said second steering guidance member through said second linkage means.

10. The invention of claim 1 wherein the number of guidance members is two, and wherein said guidance members are positioned on laterally opposite sides of said vehicle and positioned to contact guide surfaces laterally adjacent to the vehicle, and wherein said linkage means connects a respective one of said guidance members with a respective one of said pair of wheels.

* * * * *